(12) United States Patent
Tonaka et al.

(10) Patent No.: US 10,458,529 B2
(45) Date of Patent: Oct. 29, 2019

(54) LINEAR MOTION MECHANISM, VALVE DEVICE, AND STEAM TURBINE

(71) Applicant: MITSUBISHI HEAVY INDUSTRIES COMPRESSOR CORPORATION, Tokyo (JP)

(72) Inventors: Hideki Tonaka, Tokyo (JP); Naoyuki Nagai, Tokyo (JP); Yoshitaka Hamamoto, Tokyo (JP); Makoto Katagake, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 202 days.

(21) Appl. No.: 15/544,860

(22) PCT Filed: Oct. 9, 2015

(86) PCT No.: PCT/JP2015/078757
§ 371 (c)(1),
(2) Date: Jul. 19, 2017

(87) PCT Pub. No.: WO2016/117179
PCT Pub. Date: Jul. 28, 2016

(65) Prior Publication Data
US 2017/0356532 A1    Dec. 14, 2017

(30) Foreign Application Priority Data

Jan. 23, 2015 (JP) .................................. 2015-011029

(51) Int. Cl.
*F01D 17/26* (2006.01)
*F16H 25/22* (2006.01)
(Continued)

(52) U.S. Cl.
CPC ......... *F16H 25/2214* (2013.01); *F01D 17/10* (2013.01); *F01D 17/205* (2013.01);
(Continued)

(58) Field of Classification Search
None
See application file for complete search history.

(56) References Cited

U.S. PATENT DOCUMENTS 5,454,278 A * 10/1995 Kasuga .................... B23Q 1/58
184/5
5,685,390 A * 11/1997 Chikuma ............. B62D 5/0448
180/444

(Continued)

FOREIGN PATENT DOCUMENTS

EP          1595681 A1    11/2005
JP      2000-120825 A     4/2000
(Continued)

OTHER PUBLICATIONS

International Search Report issued in corresponding International Application No. PCT/JP2015/078757 dated Dec. 22, 2015, with translation (4 pages).

(Continued)

*Primary Examiner* — Michael Lebentritt
(74) *Attorney, Agent, or Firm* — Osha Liang LLP

(57) ABSTRACT

A linear motion mechanism, including a drive portion, a screw shaft which is rotationally driven about an axis by the drive portion and in which a first spiral screw groove is formed on an outer peripheral surface, a nut in which a second spiral screw groove facing the first screw groove is formed on an inner peripheral surface and which moves forward or backward relative to the screw shaft in an axial direction, in which an axis of the screw shaft extends, according to a rotation of the screw shaft, a plurality of load (Continued)

balls which are disposed in a transfer path formed by the first screw groove and the second screw groove and advance while rolling on the transfer path, a plurality of retainer frames which are disposed between the plurality of load balls and advances on the transfer path along with the load balls.

5 Claims, 9 Drawing Sheets

(51) Int. Cl.
    *F01D 17/10*          (2006.01)
    *F16H 57/04*         (2010.01)
    *F16K 31/04*         (2006.01)
    *F16K 31/50*         (2006.01)
    *F01D 17/20*         (2006.01)
    *F16K 31/52*         (2006.01)

(52) U.S. Cl.
    CPC ......... *F01D 17/26* (2013.01); *F16H 57/0497* (2013.01); *F16K 31/042* (2013.01); *F16K 31/047* (2013.01); *F16K 31/50* (2013.01); *F16K 31/504* (2013.01); *F16K 31/52* (2013.01); *F05D 2220/31* (2013.01); *F05D 2240/24* (2013.01); *F05D 2260/98* (2013.01)

(56) References Cited

U.S. PATENT DOCUMENTS

| | | | | |
|---|---|---|---|---|
| 5,749,265 | A * | 5/1998 | Namimatsu | F16H 25/2204 74/424.75 |
| 6,347,558 | B1 | 2/2002 | Miyaguchi et al. | |
| 6,481,893 | B1 * | 11/2002 | Greiner | F16C 29/0602 384/43 |
| 6,756,707 | B2 * | 6/2004 | Hochhalter | F16H 25/20 310/20 |
| 7,159,484 | B2 * | 1/2007 | Ohkubo | F16C 19/20 384/520 |
| 2005/0255186 | A1 * | 11/2005 | Hiraga | B29C 45/83 425/542 |
| 2006/0137485 | A1 * | 6/2006 | Ohkubo | F16C 29/0609 74/424.87 |
| 2014/0234084 | A1 * | 8/2014 | Katagake | F01D 17/145 415/151 |
| 2016/0207512 | A1 * | 7/2016 | Komaba | B60T 7/042 |
| 2017/0002680 | A1 * | 1/2017 | Tonaka | F01D 17/145 |

FOREIGN PATENT DOCUMENTS

| | | |
|---|---|---|
| JP | 2001-254801 A | 9/2001 |
| JP | 2002-122204 A | 4/2002 |
| JP | 2004-132515 A | 4/2004 |
| JP | 2013-072349 A | 4/2013 |
| WO | 2004/067258 A1 | 8/2004 |

OTHER PUBLICATIONS

Written Opinion of the International Searching Authority issued in PCT/JP2015/078757 dated Dec. 22, 2015, with translation (11 pages).

\* cited by examiner

LINEAR MOTION MECHANISM, VALVE DEVICE, AND STEAM TURBINE

TECHNICAL FIELD

One or more embodiments of the invention relate to a linear motion mechanism, a valve device, and a steam turbine.

Priority is claimed on Japanese Patent Application No. 2015-011029, filed on Jan. 23, 2015, the content of which is incorporated herein by reference.

BACKGROUND ART

A steam turbine is used to drive a machine or the like and includes a turbine main body having a rotor which is rotatably supported. The rotor is rotationally driven by supplying steam serving as a working fluid to the turbine main body. Steam supplied to the turbine main body or steam extracted from the turbine main body flows through the steam flow path of the steam turbine. An adjustment valve is provided in the steam flow path. It is possible to adjust a flow rate of the steam supplied to the turbine main body by adjusting an opening degree of the adjustment valve.

The adjustment valve is driven by an adjustment valve drive device. For example, as the adjustment valve drive device, there is a device having an electric motor serving as a drive source and a linear motion mechanism such as a ball screw which converts a rotational motion of the electric motor to a linear motion of the adjustment valve.

For example, the linear motion mechanism is disclosed in PTL 1. In the linear motion mechanism disclosed in PTL 1, a screw shaft having a screw groove on an outer peripheral surface and a nut having a screw groove on an inner peripheral surface are combined and a transfer path is formed by both screw grooves facing each other. In the linear motion mechanism, since a plurality of balls roll on the transfer path, a rotational motion and a linear motion are converted to each other by a small friction force.

CITATION LIST

Patent Literature

[PTL 1] Japanese Unexamined Patent Application, First Publication No. 2004-132515

In the linear motion mechanism, in order to effectively roll the load balls which are the balls, a lubricant is attached to the transfer path. However, in portions in which the load balls are in contact with the transfer path, the lubricant may be pushed out by the load balls. Accordingly, in a case where minute rolling motion is locally repeated in the transfer path, the lubricant is not sufficiently supplied to the portions at which the load balls are in contact with the transfer path, and there is a concern that a lubrication failure occurs.

SUMMARY OF INVENTION

One or more embodiments of the present invention provide a linear motion mechanism, a valve device, and a steam turbine capable of preventing a lubrication failure in the transfer path.

According to one or more embodiments of the present invention, a linear motion mechanism is provided, including: a drive portion; a screw shaft which is rotationally driven about an axis by the drive portion and in which a first spiral screw groove is formed on an outer peripheral surface; a nut in which a second spiral screw groove facing the first screw groove is formed on an inner peripheral surface, into which the screw shaft is inserted, and which moves forward or backward relative to the screw shaft in an axial direction, in which an axis of the screw shaft extends, according to a rotation of the screw shaft; a plurality of load balls which are disposed in a transfer path formed by the first screw groove and the second screw groove and advance while rolling on the transfer path; a plurality of retainer frames which are disposed between the plurality of load balls and advances on the transfer path along with the load balls; and a lubricant supply portion which supplies a lubricant to a path surface of the transfer path, in which the retainer frame includes a retainer main body portion in which recessed surfaces, on which outer peripheral ends are in contact with the adjacent load balls, are formed on both sides in an advancement direction and which is formed to be smaller than the load ball when viewed in the advancement direction, and a lubricant contact portion which protrude from the outer peripheral end of the recessed surface of the retainer main body portion toward the path surface side of the transfer path and is formed so as to be able to come into contact with the lubricant which is supplied to the path surface of the transfer path.

According to this configuration, by only advancing the retainer frame on the transfer path while pressing the retainer frame by the load ball, the pushed lubricant is equalized to be pushed back by the lubricant contact portions, and it is possible to return the state of the lubricant to a uniform film state. Accordingly, even when a portion of the lubricant having a film thickness which is thin and a portion of the lubricant having a film thickness which is thick are generated by the load ball, it is possible to equalize the lubricant to be evenly distributed on the path surface of the transfer path.

In the linear motion mechanism in one or more embodiments of the present invention, the lubricant contact portion may be formed such that a length of a cross-sectional shape of the lubricant contact portion parallel in the advancement direction decreases toward an inside position interposed between the recessed surfaces from the outer peripheral ends of both recessed surfaces in the advancement direction toward the path surface side of the transfer path.

According to this configuration, a contact area of the lubrication contact portion with respect to the lubricant supplied to the path surface of the transfer path can be decreased from the outer peripheral surface of the recessed surface toward the path surface of the transfer path. Accordingly, it is possible to decrease influences such as a friction resistance generated by the lubricant contact portion, and the transfer of the retainer frame can be smoothly performed. Therefore, it is possible to prevent inhibition of the advancement of the load ball by the retainer frame including the lubricant contact portions protruding toward the path surface side of the transfer path.

In the linear motion mechanism in one or more embodiments of the present invention, the lubricant contact portion may be formed such that a cross-sectional shape orthogonal to the advancement direction partially protrudes toward the path surface of the transfer path more than the load ball.

According to this configuration, the lubricant contact portion protrudes toward the path surface side of the transfer path more than the load ball. Accordingly, the lubricant contact portion can come into substantial contact with the lubricant G attached to the vicinity of the path surface of the transfer path. The portion of the lubricant contact portion protruding more than the load ball is not formed over the entire region in the circumferential direction and is partially formed in the circumferential direction. Accordingly, even in a case where the lubricant contact portion and the path surface of the transfer path come into contact with each other, it is possible to decrease the contact region. Therefore, it is possible to decrease influences such as friction resistances generated by the lubricant contact portion when the retainer frame advances on the transfer path. Accordingly, it is possible to smoothly advance the retainer frame on the transfer path while returning the state of the lubricant to a uniform film state with high accuracy.

According to one or more embodiments of the present invention, a valve device is provided which opens and closes a flow path through which a working fluid flows by a valve body to adjust a flow rate of the working fluid, the valve device including: the valve body; and the linear motion mechanism which moves the valve body forward and backward to open and close the flow path by the valve body.

In the valve device according to one or more embodiments of the present invention, the valve device may further include a linear motion member which moves in forward and backward directions along with the nut, and a transmission portion which moves the valve body in a close direction which brings the flow path into a closed state where the working fluid cannot flow when the linear motion member moves forward and moves the valve body in an open direction which brings the flow path into an open state where the working fluid can flow when the linear motion member moves backward, in which the transmission portion may decrease a movement amount of the linear motion member and transmit the decreased movement amount to the valve body.

According to this configuration, even when the movement amount of the valve body is small, it is possible to increase the movement amount of the linear motion member. Therefore, it is possible to increase an operation stroke sensitivity of the linear motion mechanism with respect to the opening degree of the valve.

According to one or more embodiments, a steam turbine is provided, including: a turbine main body which includes a blade which is rotated by the working fluid; and the valve device.

According to this configuration, it is possible to effectively roll the load ball by preventing a lubrication failure. As a result, it is possible to increase reliability of the steam turbine having the linear motion mechanism.

According to one or more embodiments, the lubricant with respect to the path surface of the transfer path is equalized by the lubricant contact portion so as to be evenly distributed, and thus, it is possible to prevent a lubrication failure.

DETAILED DESCRIPTION OF EMBODIMENTS

Hereinafter, embodiments of the invention will be described with reference to FIGS. 1 to 6B.

Figure 1:
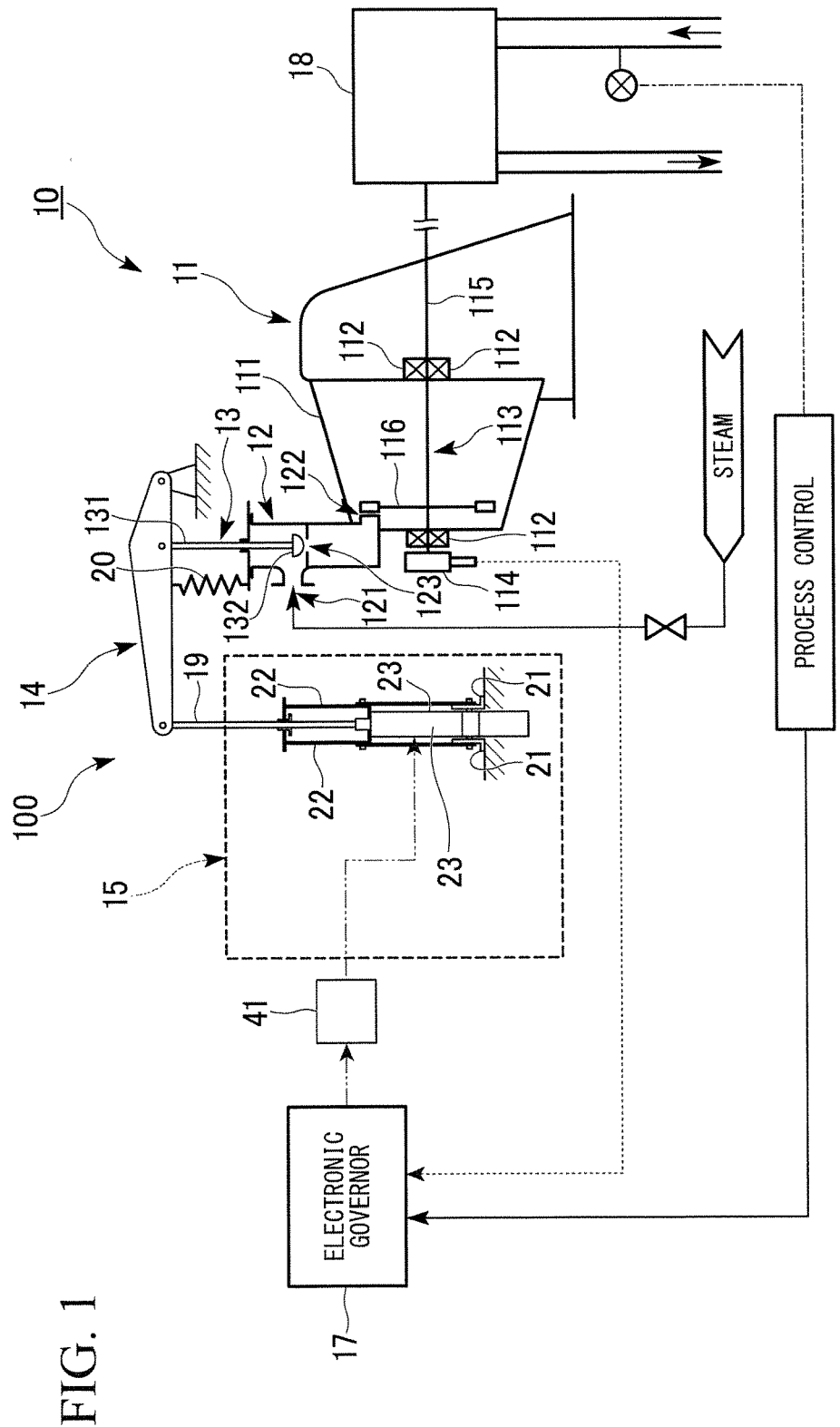
FIG. 1 is a schematic view showing the overall configuration of a steam turbine according to one or more embodiments of the invention.

FIG. 1 is a schematic view showing the overall configuration of a steam turbine 10 according to one or more embodiments of the invention.

As shown in FIG. 1, a steam turbine 10 of one or more embodiments includes a turbine main body 11, a steam flow path 12, a valve device 100, a servo controller 41, and an electronic governor 17. Steam serving as a working fluid flows through the steam flow path 12. The servo controller 41 controls the valve device 100. The electronic governor 17 controls the speed of the steam turbine 10.

The turbine main body 11 includes a casing 111, bearings 112, a rotor 113, and a speed detection sensor 114. The casing 111 is formed in a tubular shape. The bearings 112 are provided in the casing 111. The rotor 113 is rotatably supported by the bearings 112 and is disposed inside the casing 111. The speed detection sensor 114 detects a rotational speed of the rotor 113. The rotor 113 includes a rotary shaft 115 and a plurality of blades 116 fixed to the rotary shaft 115.

The blades 116 configured as described above are rotated by steam and a compressor 18 is driven by the rotational forces of the blades 116.

The steam flow path 12 is a flow path through which steam serving as a working fluid is supplied to the turbine main body 11. Here, as the "steam flow path 12" according to one or more embodiments of the present invention, the flow path through which steam supplied to the turbine main body 11 flows is described as an example. However, the steam flow path 12 is not limited to this. For example, the steam flow path 12 may be a flow path through which steam extracted from the turbine main body 11 flows.

In the steam flow path 12 of one or more embodiments, steam is introduced from a steam introduction port 121 on one end side (a first end side). A steam supply port 122 on the other end side (a second end side) of the steam flow path 12 is connected to the turbine main body 11. A throttle hole 123 by which a flow path width of the steam flow path 12 is narrowed is provided between the steam introduction port 121 and the steam supply port 122.

The valve device 100 opens and closes the steam flow path 12 through which steam flows in order to adjust a flow rate of the steam in the turbine main body 11. The valve device 100 includes an adjustment valve 13, a lever member 14, and an adjustment valve drive device 15.

The adjustment valve 13 adjusts an amount of the steam to be supplied to the turbine main body 11. The adjustment valve 13 includes a rod-shaped arm member 131 and an approximately semicircular seal member 132 (valve body) provided on the distal end portion of the arm member 131. The proximal end portion of the arm member 131 is rotatably attached to an intermediate portion of the lever member 14 in the longitudinal direction. Since the adjustment valve 13 has the above-described configuration, according to a linear motion of the arm member 131 along the steam flow path 12, the seal member 132 of the distal end portion of the arm member 131 is fitted to or separated from (in order words, is opened or closed) the throttle hole 123 of the steam flow path 12. Accordingly, a size of an opening between the throttle hole 123 and the seal member 132 is changed. Therefore, the flow rate of the steam supplied to the turbine main body 11 via the throttle hole 123 is changed.

The lever member 14 transmits the output of the adjustment valve drive device 15 to the adjustment valve 13. The lever member 14 is a member which moves the seal member 132 forward to or backward from the throttle hole 123 of the steam flow path 12. The proximal end portion of the lever member 14 in the longitudinal direction is rotatably supported. One end portion (A first end) of a lever side rod (linear motion member) 19 is rotatably attached to the distal end portion of the lever member 14 in the longitudinal direction. As described above, the other end portion (a second end) of the arm member 131 configuring the adjustment valve 13 is rotatably attached to the intermediate portion of the lever member 14 in the longitudinal direction. One end (a first end) of a pulling spring 20 is attached to the distal end side from the attachment position between the lever member 14 and the arm member 131. The pulling spring 20 functions as forcible closing means which forcibly closes the adjustment valve 13. Since the other end (a second end) of the pulling spring 20 is fixed to a frame (not shown) or the like of the steam flow path 12, the other end is immovable. That is, the pulling spring 20 applies a tension force which rotates the lever member 14 in the counter-clockwise direction in FIG. 1 to the lever member 14 in a state where an external force is not applied to the pulling spring 20.

Figure 2:
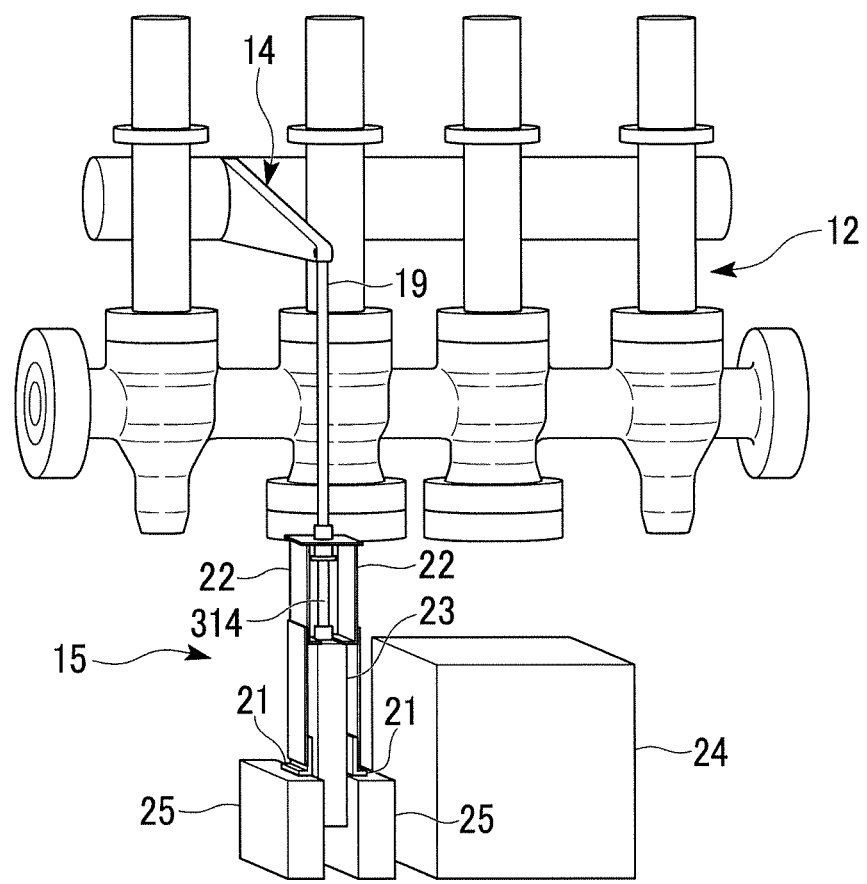
FIG. 2 is a perspective view showing the vicinity of an adjustment valve drive device of the steam turbine in one or more embodiments of the invention.

FIG. 2 is a schematic view showing the vicinity of the adjustment valve drive device 15.

The adjustment valve drive device 15 is a mechanism which drives the adjustment valve 13 which opens and closes the throttle hole 123 of the steam flow path 12 through which steam flows by the seal member 132 in order to adjust the flow rate of the steam. The adjustment valve drive device 15 includes an electric actuator 23 which drives the adjustment valve 13. The electric actuator 23 is held by a pair of brackets 21 and a holding member 22. The pair of brackets 21 is installed to be fixed. The holding member 22 is rotatably supported by the brackets 21.

Each of the pair of brackets 21 is formed in an approximately L shape in a cross section. The pair of brackets 21 is fixed on pedestals 25. The pedestals 25 are provided to be close to a bearing cover 24 of the steam turbine 10.

The bearing cover 24 accommodates the bearings 112 which rotatably support the rotary shaft 115 of the rotor 113 shown in FIG. 1.

Figure 3A:
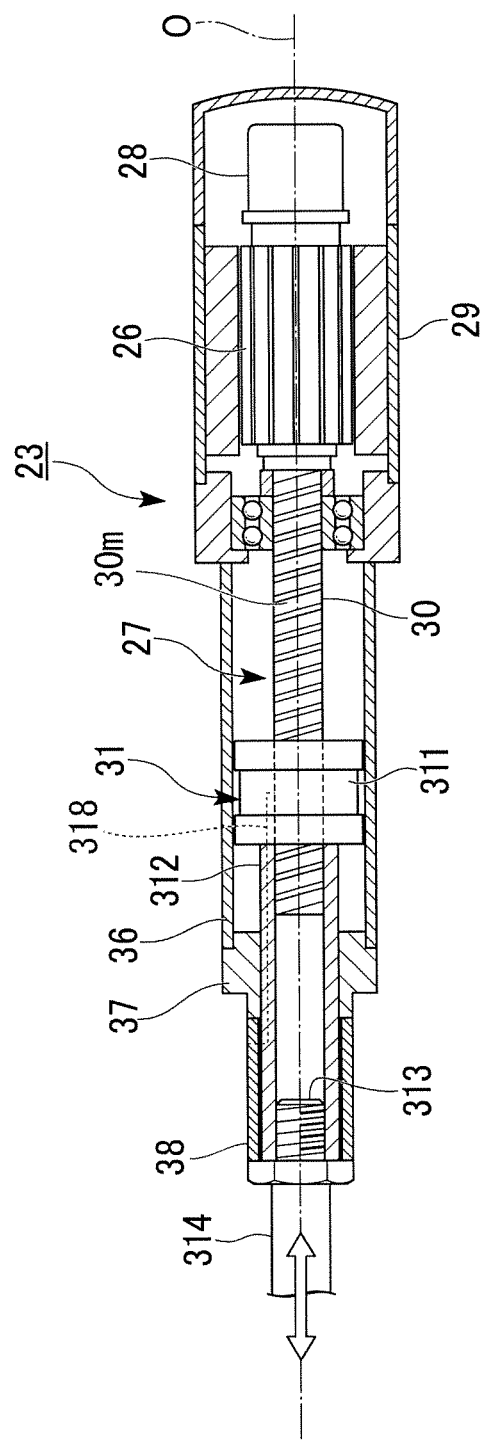
FIG. 3A is a sectional view showing an internal configuration of an electric actuator in one or more embodiments of the invention and a view showing a state before a nut moves along an axis.
Figure 3B:
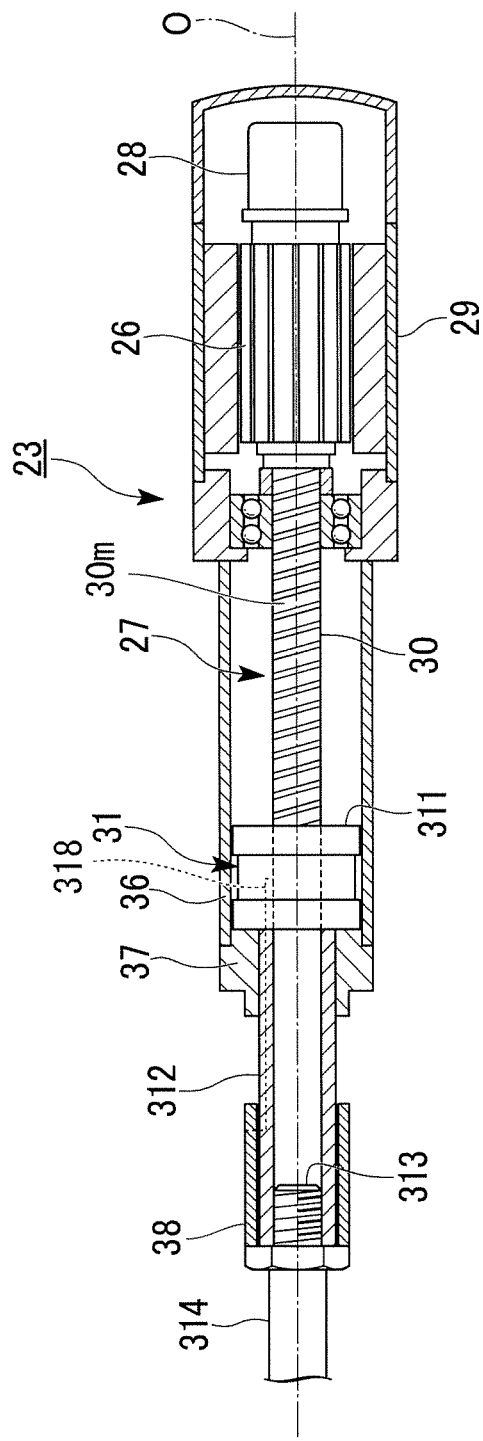
FIG. 3B is a sectional view showing the internal configuration of the electric actuator in one or more embodiments of the invention and a view showing a state after the nut moves along the axis.
Figure 4:
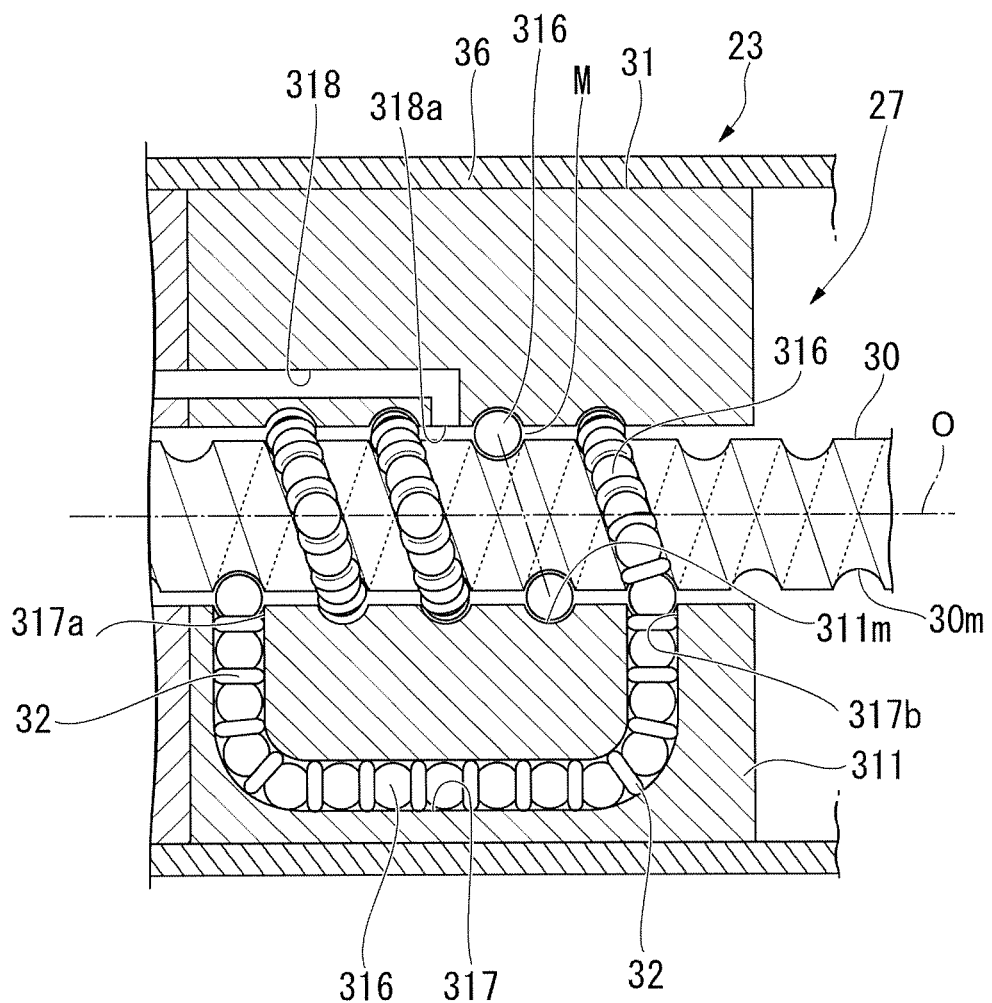
FIG. 4 is a main portion enlarged sectional view showing a configuration of a linear motion mechanism configuring the electric actuator in one or more embodiments of the invention.

FIGS. 3A and 3B are sectional views of the internal configuration of the electric actuator 23. FIG. 4 is a main portion enlarged sectional view showing the configuration of the linear motion mechanism 27.

As shown in FIGS. 3A and 3B, the electric actuator 23 includes the linear motion mechanism 27 and a brake 28.

The linear motion mechanism 27 is a mechanism which converts a rotational motion of an electric motor 26 to a linear motion of the lever side rod 19. The linear motion mechanism 27 is a ball screw mechanism. Specifically, the linear motion mechanism 27 of one or more embodiments includes the electric motor 26, a screw shaft 30, a piston unit 31, and a piston casing 36. The electric motor 26 is a drive portion. The screw shaft 30 is connected to a drive shaft of the electric motor 26 and is rotationally driven about an axis O by the electric motor 26. The piston unit 31 moves forward or backward relative to the screw shaft 30 in an axis O direction (right and left directions on the paper surface of FIGS. 3A and 3B) in which the axis O of the screw shaft 30 extends, according to the rotation of the screw shaft 30. The piston casing 36 covers the piston unit 31 from the outside.

The electric motor 26 is a drive portion which receives power and rotates the drive shaft. The electric motor 26 is accommodated in a motor accommodation portion 29. The motor accommodation portion 29 is provided in the proximal end portion of the electric actuator 23 and the inside of the motor accommodation portion 29 is closed. Accordingly, an explosion-proof structure is formed in which the electric motor 26 is isolated from the surrounding oil.

The screw shaft 30 is a long screw member. A first screw groove 30*m* is formed on the outer peripheral surface of the screw shaft 30. The first screw groove 30*m* has a spiral shape extending in the circumferential direction while heading in the axis O direction. One end side (the left side on the paper surface in FIGS. 3A and 3B) of the screw shaft 30 in the axis O direction is connected to the drive shaft of the electric motor 26.

The electric actuator 23 includes a brake 28 at a position opposite to the screw shaft 30 in a state where the electric motor 26 is interposed therebetween. The brake 28 includes an electromagnetic disk brake. The brake 28 is operated when a supply of power is cut off to brake the rotation of the electric motor 26.

The electronic governor 17 issues a valve opening degree command to the servo controller 41 for controlling the speed of the steam turbine 10 to adjust the valve opening degree.

The piston unit 31 reciprocates along the screw shaft 30. As shown in FIGS. 3A and 3B, the piston unit 31 of one or more embodiments includes a nut 311, load balls 316, a lubricant supply portion 318, retainer frames 32, a cylinder rod 312, a rod end connector 313, and an actuator side rod 314. The nut 311 and the screw shaft 30 form a transfer path M. The load balls 316 advance while rolling on the transfer path M. The lubricant supply portion 318 supplies a lubricant G to the path surface of the transfer path M. The retainer frames 32 advance on the transfer path M along with the load balls 316. The screw shaft 30 is inserted into the cylinder rod 312. The rod end connector 313 is provided on one end side of the cylinder rod 312 in the axis O direction. The actuator side rod 314 is connected to the cylinder rod 312 via the rod end connector 313.

The nut 311 is a member having an approximately annular shape. The screw shaft 30 is inserted into the nut 311 so as to be screwed. As shown in FIG. 4, a second screw groove 311*m* is formed on the inner peripheral surface of the nut 311. The second screw groove 311*m* is formed in a spiral shape facing the first screw groove 30*m*. When the screw shaft 30 is inserted into the nut 311, the first screw groove 30*m* and the second screw groove 311*m* face each other, and thus, the nut 311 forms the transfer path M along with the screw shaft 30. That is, the path surface of the transfer path M is formed by the outer peripheral surface of the first screw groove 30*m* and the inner peripheral surface of the second screw groove 311*m*. A circulation path 317 is formed inside the nut 311. The load balls 316 circulate between one end side and the other end side (the right end on the paper surface in FIGS. 3A and 3*b*) of the nut 311 in the axis O direction through the circulation path 317. Both end portions 317*a* and 317*b* of the circulation path 317 are open to the inner peripheral surface of the nut 311 such that the one end side and the other end side of the transfer path M communicate with each other.

Each of the load balls 316 is formed in a spherical shape. The plurality of load balls 316 are disposed on the transfer path M and advance on the path surface of the transfer path M while rolling on the path surface. The load balls 316 roll between the first screw groove 30*m* and the second screw groove 311*m* forming the path surface of the transfer path M. Accordingly, the load balls 316 displace the nut 311 in the axis O direction relative to the screw shaft 30 while rotating the nut 311 around the axis O relative to the screw shaft 30. The load balls 316 advance on the path surface of the transfer path M from the one end side toward the other end side in the axis O direction. Thereafter, the load balls 316 enter the circulation path 317 at the one end side in the axis O direction and are fed to the other end side of the transfer path M again.

The lubricant supply portion 318 supplies the lubricant G to the transfer path M to smoothly roll the load balls 316. The lubricant supply portion 318 includes a discharge port 318*a*. The discharge port 318*a* is open from the inner peripheral surface of the nut 311 toward the outer peripheral surface of the screw shaft 30. The lubricant supply portion 318 is connected to a supply source (not shown) of the lubricant G. The lubricant supply portion 318 supplies the lubricant G such that the lubricant G is attached to the path surface of the transfer path M to form a thin film shape. For example, for the lubricant G of one or more embodiments, grease having high viscosity is used.

Figure 5:
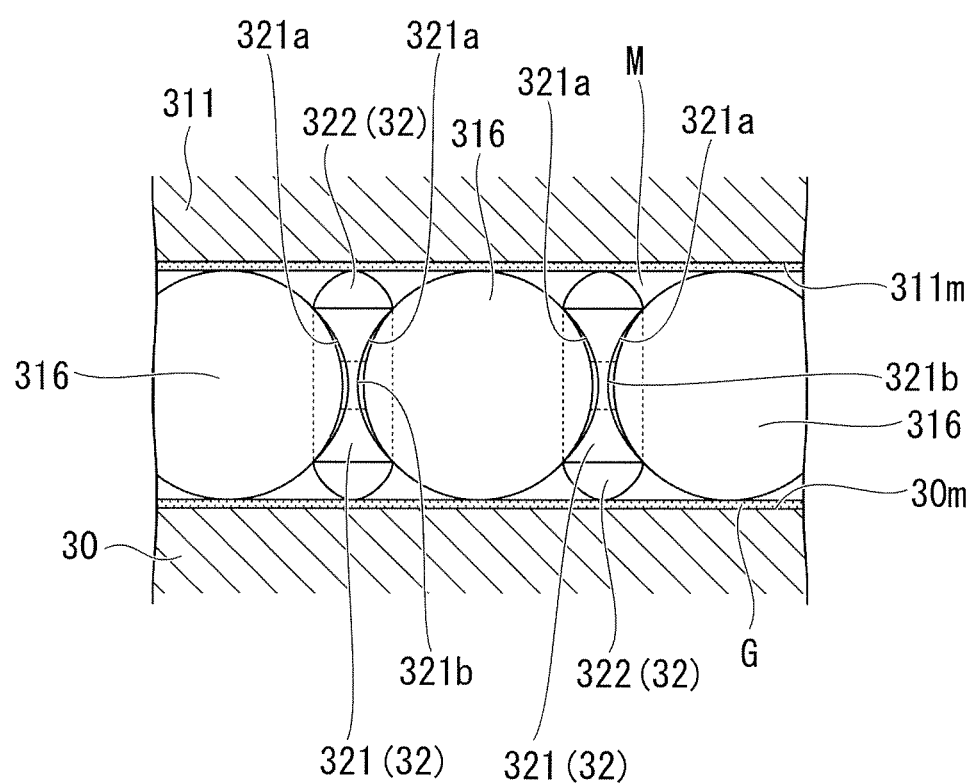
FIG. 5 is a main portion enlarged view showing a relationship between a load ball and a retainer frame in a transfer path in one or more embodiments of the invention.

FIG. 5 is a main portion enlarged view showing a relationship between the load ball and the retainer frame in a transfer path.

As shown in FIG. 5, the retainer frames 32 are disposed in the transfer path M so as to be positioned between the pair of the load balls 316. The retainer frames 32 are pressed by the rolling load balls 316 and advance on the transfer path M along with the load balls 316. Each of the retainer frames 32 includes a retainer main body portion 321 and lubricant contact portions 322. In the retainer main body portion 321, recessed surfaces 321*a* are disposed on which the outer peripheral ends are in contact with the adjacent load balls 316. The lubricant contact portion 322 protrudes toward the path surface side of the transfer path M more than the outer peripheral end of the recessed surface 312*a* of the retainer main body portion 321.

When viewed in an advancement direction, the retainer main body portion 321 is formed so as to be smaller than the load ball 316. The retainer main body portion 321 of one or more embodiments is formed in a disk shape having a smaller diameter than the diameter of the load ball 316. In the retainer main body portion 321, the recessed surfaces 321*a* which are recessed from the outer peripheral end toward the inside are formed on the end surfaces on both sides facing the advancement direction. A circular through-hole 321*b* which penetrates the recessed surfaces 321*a* is formed at the center portion of the retainer main body portion 321.

The recessed surface 321*a* is formed such that the outer peripheral end becomes the end portion of the outer peripheral surface, which is a surface directed to the path surface side of the transfer path M of the retainer main body portion 321. The recessed surface 321*a* is formed in a semi-spherical shape which has a larger curvature radius than the curvature radius of the load ball 316. In the recessed surface 321*a* of one or more embodiments, only the outer peripheral end which is formed in a circular shape comes into contact with the adjacent load ball 316.

The lubricant contact portion 322 is formed to be able to be in contact with the lubricant G supplied to the path surface of the transfer path M. The lubricant contact portion 322 protrudes from the outer peripheral surface of the retainer main body portion 321 toward the path surface. The lubricant contact portion 322 is formed such that a length of the cross-sectional shape of the lubrication contact portion 322 parallel in the advancement direction decreases toward an inside position interposed between the recessed surfaces 321*a* from the outer peripheral ends of the recessed surfaces 321*a* of both sides toward the path surface side of the transfer path M. In the lubricant contact portion 322 of one or more embodiments, the cross-sectional shape parallel in the advancement direction is formed in a triangular shape. The lubricant contact portion 322 is formed to have the same protrusion amount over the entire periphery of the retainer main body portion 321. The lubricant contact portion 322 protrudes from the retainer main body portion 321 such that the lubricant contact portion 322 is not in contact with the path surface of the transfer path M and is in contact with the thin-film shaped lubricant G formed on the path surface of the transfer path M.

As shown in FIGS. 3A and 3B, the cylinder rod 312 is formed such that the screw shaft 30 can be inserted into the inside of the cylinder rod 312. The cylinder rod 312 is formed in a tubular shape which covers the outside of the screw shaft 30. The proximal end portion of the cylinder rod 312 is fixed to one end portion of the nut 311 in the axis O direction by a fixture such as a bolt.

The rod end connector 313 is a member which is mounted on the distal end portion of the cylinder rod 312. A female screw is formed on the inner peripheral surface of the distal end side of the rod end connector 313.

The actuator side rod 314 is a member which extends in the direction in which the cylinder rod 312 extends. A male screw is formed on the other end of the actuator side rod 314 in the axis O direction. The male screw of the actuator side rod 314 is screwed to the female screw of the rod end connector 313 so as to be fixed. One end side of the actuator side rod 314 in the axis O direction is connected to the lever side rod 19 which is the lever member 14.

The piston casing 36 covers the screw shaft 30 and the nut 311 from the outside of the screw shaft 30 in the radial direction. The outer peripheral surface of the nut 311 is in sliding contact with the inner peripheral surface of the piston casing 36. The piston casing 36 includes a piston cap 37 which seals one end side of the piston casing 36 in the axis O direction. In the piston cap 37, an opening into which the cylinder rod 312 is inserted is formed. In this case, the end portion on the one end side of the cylinder rod 312 in the axis O direction is always exposed to the outside from the piston casing 36. The piston cap 37 restrains the movement of the nut 311 in the axis O direction.

The electronic governor 17 controls the operation of the adjustment valve drive device 15.

As shown in FIG. 1, a process control is performed based on the detection results of the pressure or the temperature in the compressor 18, and the control results are input to the electronic governor 17. A rotational speed of the blade 116 detected by the speed detection sensor 114 configuring the turbine main body 11 is input to the electronic governor 17. An instruction from a user input from an operation panel (not shown) is input to the electronic governor 17. The electronic governor 17 controls the operation of the adjustment valve drive device 15 based on each input. More specifically, the electronic governor 17 issues the valve opening degree command to the servo controller 41 which controls the electric motor 26 configuring the electric actuator 23, based on each input.

In the above-described steam turbine 10, a signal is sent to the electric actuator 23 by the servo controller 41 according to the valve opening degree command from the electronic governor 17. Accordingly, the drive shaft of the electric motor 26 is rotated. The screw shaft 30 rotates around the axis O by the rotation of the drive shaft of the electric motor 26. According to the rotation of the screw shaft 30, the load balls 316 rolls on the transfer path M to which the lubricant G is supplied from the lubricant supply portion 318. The load balls 316 advance from the other end side in the axis O direction toward the one end side. Since the load balls 316 are in contact with the retainer main body portions 321, the load balls 316 advance on the transfer path M while pressing the retainer frames 32. After the load balls 316 advance from the other end side in the axis O direction toward the one end side, the load balls 316 enter the circulation path 317 along with the retainer frames 32 and are fed to the other end side of the transfer path M again. As a result, the load balls 316 are circulated.

Since the load balls 316 roll on the transfer path M, with respect to the screw shaft 30 rotating around the axis O, the nut 311 moves while rotating with respect to the screw shaft 30. In this case, the nut 311 moves relative to the screw shaft 30 in the axis O direction according to the rotation direction of the screw shaft 30. As a result, the nut 311 moves from the position of FIG. 3A to the position of the FIG. 3B. Accordingly, the cylinder rod 312, the rod end connector 313, and the actuator side rod 314 connected to the nut 311 also move along the axis O of the screw shaft 30 along with the nut 311. Since the actuator side rod 314 moves in the axis O direction, the adjustment valve 13 is driven via the lever member 14. By driving the adjustment valve 13, the seal member 132 moves with respect to the throttle hole 123 of the steam flow path 12 through which steam flows to be opened and closed, and the flow rate of the steam is adjusted.

According to the above-described configured linear motion mechanism 27, the retainer main body portions 321 advance on the transfer path M while coming into contact with the load balls 316. As a result, the lubricant contact portions 322 move while coming into contact with the lubricant G which is supplied from the lubricant supply portion 318 and is attached to form a thin film on the path surface of the transfer path M. Accordingly, the lubricant G attached to the transfer path M in a state of being partially biased can be equalized by the retainer frames 32.

For example, in the steam turbine 10, a change in a supply amount of steam is small during a normal operation. Accordingly, the adjustment amount of the opening degree of the adjustment valve 13 performed by the adjustment valve drive device 15 becomes small. As a result, the adjustment valve drive device 15 is continuously operated in a state where the opening degree of the adjustment valve 13 is approximately constant, and continues to oscillate slightly. In the linear motion mechanism 27 of the adjustment valve drive device 15 which continues to oscillate slightly, as shown in FIGS. 6A and 6B, the load ball 316 continues to be in contact with the transfer path M at a certain angle.

Figure 6A:
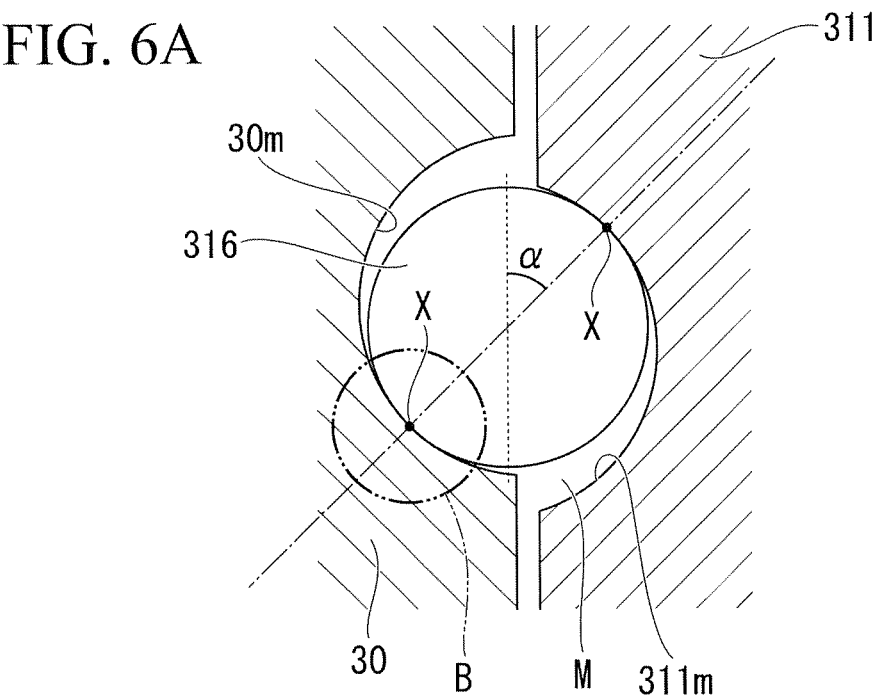
FIG. 6A is a sectional view showing a relationship between the transfer path and the load ball and a sectional view showing the relationship between the load ball and the transfer path in a cross section orthogonal to an advancement direction of the load ball.
Figure 6B:
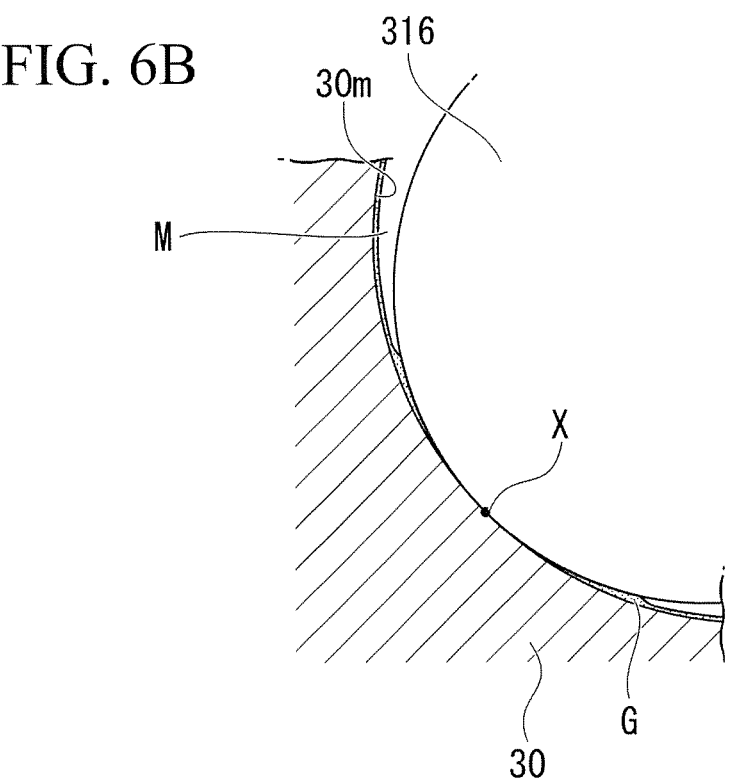
FIG. 6B is a sectional view showing the relationship between the transfer path and the load ball and is a main portion sectional view showing a portion where the load ball and the transfer path are in contact with each other in an enlarged manner.

FIG. 6A is a view showing the relationship between the load ball 316 and the transfer path M in a cross section orthogonal to the advancement direction of the load ball 316. FIG. 6B is a view showing a region B which is a portion where the load ball 316 and the transfer path M are in contact with each other in FIG. 6A in an enlarged manner.

Specifically, since the linear motion mechanism 27 continues to oscillate slightly, as shown in FIG. 6A, the load ball 316 advances in a state where a contact angle $\alpha$ is constant. The contact angle $\alpha$ is an angle between the axis O direction and a virtual line connecting contact points X at which the load ball 316 comes into contact with the first screw groove 30$m$ and the second screw groove 311$m$ forming the transfer path M. Therefore, the load ball 316 repeats a local reciprocation with respect to the transfer path M in a state where the positions of the contact points X in a cross section orthogonal to the advancement direction are always the same. As shown in FIG. 6B, since a high load is applied to the contact point X from the load ball 316, a thin film-shaped lubricant G attached to the path surface of the transfer path M in the contact point X is pushed out. Accordingly, at the contact point X, the load ball 316 advances on the transfer path M in a state where the lubricant G is always pushed out and does not exist, and there is a concern that a lubrication failure may occur.

In one or more embodiments, the retainer frame 32 includes the lubricant contact portions 322 which are positioned in the path surface side of the transfer path M with respect to the outer peripheral ends of the recessed surfaces 321$a$ of the retainer main body portion 321. Accordingly, by only advancing the retainer frame 32 on the transfer path M while pressing the retainer frame 32 by the load ball 316, the pushed lubricant G is equalized to be pushed back by the lubricant contact portions 322, and it is possible to return the state of the lubricant G to a uniform film state. Accordingly, even when a portion of the lubricant G having a film thickness which is thin and a portion of the lubricant G having a film thickness which is thick are partially generated by the load ball 316, it is possible to equalize the lubricant G to be evenly distributed on the path surface of the transfer path M. Therefore, it is possible to prevent a lubrication failure on the transfer path M.

The cross-sectional shape of the lubricant contact portion 322 parallel in the advancement direction is a triangle shape. Therefore, a contact area of the lubrication contact portion 322 with respect to the thin-film shaped lubricant G formed on the path surface of the transfer path M can be decreased from the outer peripheral surface of the retainer main body portion 321 toward the path surface of the transfer path M. Accordingly, it is possible to decrease influences such as a friction resistance generated by the lubricant contact portion 322. As a result, it is possible to smoothly advance the retainer frame 42 on the transfer path M. Therefore, it is possible to prevent inhibition of the advancement of the load ball 316 by the retainer frame 32 including the lubricant contact portions 322 protruding from the outer peripheral surfaces of the retainer main body portion 321 toward the path surface side of the transfer path M.

In the linear motion mechanism 27 configuring the adjustment valve drive device 15, a lubrication failure is prevented, and thus, it is possible to effectively roll the load balls 316. As a result, it is possible to increase reliabilities of the linear motion mechanism 27, the adjustment valve drive device 15 having the same, and the steam turbine 10 having the same.

Figure 7:
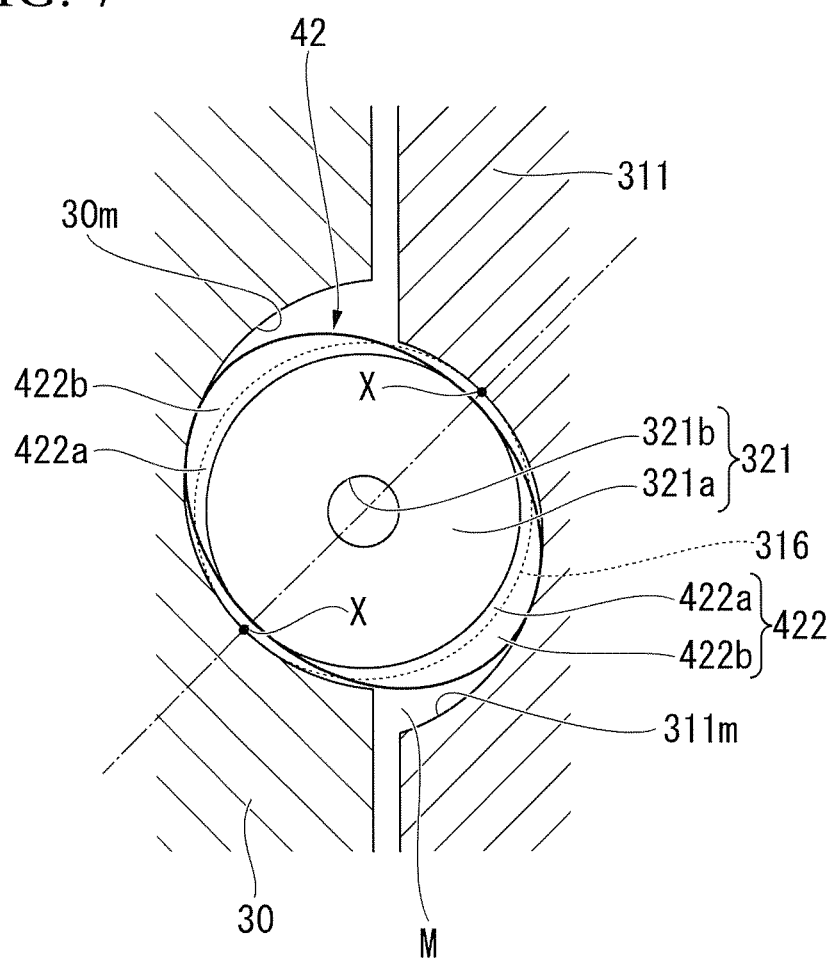
FIG. 7 is a main portion enlarged view explaining a relationship between a load ball and a retainer frame in a transfer path of one or more embodiments of the invention.

Next, the linear motion mechanism 27 of one or more embodiments will be described with reference to FIG. 7.

In one or more embodiments, the same reference numerals are assigned to the same components as those of one or more embodiments, and detailed descriptions thereof are omitted. In the linear motion mechanism 27 of embodiments described below, the shape of the lubricant contact portion of the retainer frame is different from the embodiments described above.

In the retainer frame 42 of the embodiments described below, the shape of the retainer main body portion 321 is similar to that of the embodiments described above, with the only difference being a shape of a lubricant contact portion 422. The lubricant contact portion 422 of one or more embodiments partially protrudes from the outer peripheral surface of the retainer main body portion 321 toward the path surface at a different protrusion amount in the peripheral direction. That is, in the lubricant contact portion 422, the cross-sectional shape orthogonal to the advancement direction is formed to partially protrude toward the path surface of the transfer path M more than the load ball 316.

Specifically, the lubricant contact portion 422 of one or more embodiments includes a first contact portion 422a and a second contact portion 422b. In the first contact portion 422a, the outer diameter of the cross-sectional shape orthogonal to the advancement direction is formed to be inside the outer diameter of the load ball 316. The second contact portion 422b is positioned on the outer side which is the path surface side of the transfer path M than the first contact portion 422a. In the second contact portion 422b, the outer diameter of the cross-sectional shape orthogonal to the advancement direction is formed to be outside the outer diameter of the load ball 316. In the lubricant contact portion 422 of one or more embodiment, the first contact portion 422a and the second contact portion 422b are integrally formed with each other. In each of the first contact portion 422a and the second contact portion 422b, the cross-sectional shape parallel in the advancement direction is a triangular shape. The lubricant contact portion 422 is formed by changing the protrusion amount such that only a portion of the retainer main body portion 321 in the circumferential direction protrudes from the load ball 316. More specifically, in the lubricant contact portion 422, with respect to the first contact portion 422a, the second contact portion 422b is not formed over the entire region in the circumferential direction and is partially formed in the circumferential direction. The second contact portion 422b is formed to most protrude at positions orthogonal to the virtual line connecting the contact points X, which are positions at which the load ball 316 come into contact with the path surface of the transfer path M.

The second contact portion 422b of the lubricant contact portion 422 may be formed at a position at which the load ball 316 comes into most difficult contact with the path surface of the transfer path M. In the second contact portion 422b, an inclined surface by which the contacted lubricant G may be pushed back from the portion which protrudes toward the path surface of the transfer path M more than the load ball 316 toward the portion which does not protrude than the load ball 316 of the first contact portion 422a is formed. The second contact portion 422b of one or more embodiments is formed to most protrude at the position orthogonal to the virtual line connecting the contact points X, which is the position at which the load ball 316 comes into contact with the path surface of the transfer path M. That is, the lubricant contact portion 422 of one or more embodiments is formed in an elliptical shape in which the outer diameter of the cross-sectional shape orthogonal to the advancement direction of the retainer frame 32 is a short diameter at the contact point X and is a long diameter at the position orthogonal to the virtual line.

Moreover, the second contact portion 422b may partially protrude toward the path surface side of the transfer path M more than the load ball 316, and is not limited to the shape of one or more embodiments in which the second contact portion 422b most protrudes at the position orthogonal to the contact point X. For example, the second contact portion 422b may be formed outside the first contact portion 422a. Specifically, the second contact portion 422b may be formed such that only one arbitrary point of the second contact portion 422b in the circumferential direction protrudes from the load ball 316 toward the path surface side of the transfer path M. The second contact portion 422b may be formed such that a plurality of locations of the second contact portion 422b in the circumferential direction protrude from the load ball 316 toward the path surface side of the transfer path M.

According to the above-described linear motion mechanism 27, the second contact portion 422b of the lubricant contact portion 422 is positioned in the path surface side of the transfer path M with respect to the load ball 316. Accordingly, the lubricant contact portion 422 can come into substantial contact with the thin-film shaped lubricant G attached to the vicinity of the path surface of the transfer path M. As a result, by only advancing the retainer frame 42 on the transfer path M while pressing the retainer frame 42 by the load ball 316, the pushed lubricant G can be largely pushed back by the lubricant contact portion 422.

The second contact portion 422b of the lubricant contact portion 422 which is the portion protruding more than the load ball 316 is not formed over the entire region in the circumferential direction, and is partially formed in the circumferential direction at the outer peripheral end of the retainer main body portion 321. Accordingly, even in a case where the lubricant contact portion 422 and the path surface of the transfer path M come into contact with each other, it is possible to decrease the contact region. Therefore, it is possible to decrease influences such as friction resistances generated by the lubricant contact portion 422 when the retainer frame 42 advances on the transfer path M. Accordingly, it is possible to smoothly advance the retainer frame 42 on the transfer path M while returning the state of the lubricant G to a uniform film state with high accuracy. Therefore, it is possible to prevent inhibition of the advancement of the load ball 316 by the retainer frame 42 including the lubricant contact portions 422 protruding from the outer peripheral surface of the retainer main body portion 321 toward the path surface side of the transfer path M.

The lubricant contact portion 422 is formed so as to most protrude at the position orthogonal to the contact points X, which is the position at which the load ball 316 comes into contact with the path surface of the transfer path M. Accordingly, even when the lubricant G pushed by the load ball 316 moves to the position at which the load ball 316 is most difficult to come into contact with the path surface of the transfer path M, the lubricant contact portion 422 can come into contact with the pushed lubricant G with high accuracy.

Accordingly, it is possible to effectively equalize the lubricant G to be evenly distributed on the path surface of the transfer path M. Therefore, it is possible to prevent a lubrication failure on the transfer path M with high accuracy.

Figure 8:
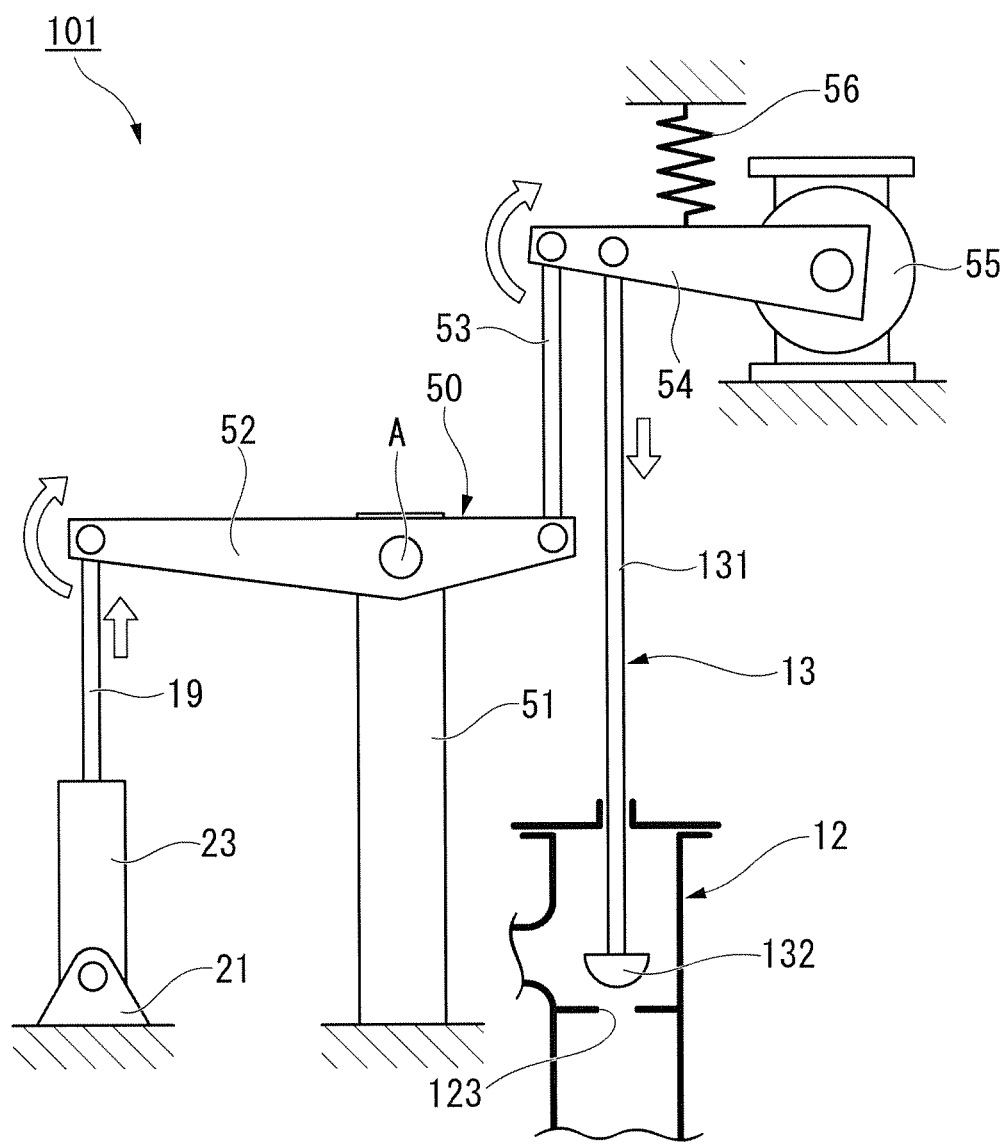
FIG. 8 is a schematic view explaining a valve device of one or more embodiments of the invention.

Next, a valve device of one or more embodiments will be described with reference to FIG. 8.

In one or more embodiments described below, the same reference numerals are assigned to the same components similar to those of the previously described embodiments, and detailed descriptions thereof are omitted. A valve device 101 of the embodiments described below is different from those of the previously described embodiments in that a transmission portion is provided.

The valve device 101 of one or more embodiments includes a transmission portion 50 which transmits an output of the adjustment valve drive device 15 to the adjustment valve 13.

The transmission portion 50 moves the adjustment valve 13 in a close direction which brings the linear motion mechanism 27 into a closed state by moving the lever side rod 19 advancing along with the nut 311 forward. The transmission portion 50 moves the adjustment valve 13 in an open direction which brings the adjustment valve 13 into an open state by moving the lever side rod 19 backward. Here, the closed state indicates a state where the throttle hole 123 is closed by the seal member 132 and steam cannot flow through the steam flow path 12. The open state indicates a state where the seal member 132 and the throttle hole 123 are separated from each other and steam can flow through the steam flow path 12. The transmission portion 50 decreases the movement amount of the linear motion mechanism 27 transmitted via the lever side rod 19 to transmit the decreased movement amount to the seal member 132 via the arm member 131.

The transmission portion 50 of one or more embodiments includes a support shaft 51, a first transmission member 52, a transmission rod 53, a second transmission member 54, a support portion 55, and a spring portion 56. The first transmission member 52 is rotatably supported by the support shaft 51. The transmission rod 53 is rotatably connected to the first transmission member 52. The second transmission member 54 is rotatably connected to the transmission rod 53. The support portion 55 rotatably supports the second transmission member 54. The spring portion 56 is attached to the second transmission member 54.

The support shaft 51 is formed in a rod shape. A proximal end side which is one end portion of the support shaft 51 is fixed to a horizontal surface such as a frame of the steam flow path 12 so that the support shaft 51 is immovable. On a distal end side of the support shaft 51 which is the other end portion, the support shaft 51 rotatably supports the first transmission member 52.

The first transmission member 52 is formed in a rod shape such that the diameter decreases toward the both end portions. One end portion of the first transmission member 52 is connected to the transmission rod 53. The other end portion of the first transmission member 52 is connected to the lever side rod 19. The first transmission member 52 is rotatably supported by the support shaft 51 on the transmission rod 53 side from the intermediate position. In the first transmission member 52 of one or more embodiments, in a case where a distance from a connection point A between the first transmission member 52 and the support shaft 51 to the end portion on the transmission rod 53 side is set to a reference, a distance from the connection point A to the end portion on the lever side rod 19 side may be several times or more the distance from the connection point A between the first transmission member 52 and the support shaft 51 to the end portion on the transmission rod 53 side.

The transmission rod 53 transmits the output of the first transmission member 52 to the second transmission member 54 to rotate the second transmission member 54. The transmission rod 53 is formed in a columnar shape. One end portion of the transmission rod 53 is rotatably connected to the end portion of the first transmission member 52. The other end portion of the transmission rod 53 is rotatably connected to the distal end portion of the second transmission member 54. The end portion on the side of the transmission member 52, to which the transmission rod 53 is connected, moves in up and down directions, and thus, the transmission rod 53 moves the distal end portion of the second transmission member 54 in up and down directions.

The support portion 55 is fixed to the horizontal surface such as a frame of the steam flow path 12 so as to be immovable.

The second transmission member 54 is a member which moves the arm member 131 so as to move the seal member 132 forward to or backward from the throttle hole 123 of the steam flow path 12. The second transmission member 54 is formed in a rod shape. In the second transmission member 54, the proximal end portion which is one end portion in the longitudinal direction is rotatably supported by the support portion 55. The proximal end portion of the arm member 131 which is the other end portion opposite to the seal member 132 is rotatably connected to the intermediate portion of the second transmission member 54 in the longitudinal direction.

The spring portion 56 is attached to the second transmission member 54 between the arm member 131 and the support portion 55. The spring portion 56 functions as forcible closing means which forcibly closes the adjustment valve 13. The end portion of the spring portion 56 which is not connected to the second transmission member 54 is fixed so that the spring portion 56 is immovable. The spring portion 56 biases the second transmission member 54 such that the seal member 132 is directed to the throttle hole 123. That is, in a state where an external force is not applied to the spring portion 56, the spring portion 56 is biased in a direction in which the spring portion 56 rotates the second transmission member 54 about the support portion 55 in the counterclockwise direction in FIG. 8.

In the above-described steam turbine 10, since the lever side rod 19 moves in the forward and rearward directions by the linear motion mechanism 27, the first transmission member 52 rotates about the connection point A at which the first transmission member 52 is connected to the support shaft 51. Since the first transmission member 52 rotates, the end portion thereof to which the transmission rod 53 is connected moves along with the transmission rod 53. Since the transmission rod 53 moves, the second transmission member 54 rotates about the support portion 55. Accordingly, the arm member 131 is lifted and lowered, and thus, the seal member 132 moves in the closed direction or the open direction with respect to the throttle hole 123. Therefore, in the adjustment valve 13, the opening between the throttle hole 123 and the seal member 132 is changed. Accordingly, the flow rate of steam supplied to the turbine main body 11 via the throttle hole 123 is changed.

According to the above-described valve device 101, the first transmission member 52 is rotatably supported by the support shaft 51 on the side closer to the transmission rod 53 than the intermediate position. Accordingly, the movement amount of the transmission rod 53 is smaller than the movement amount of the lever side rod 19. Therefore, even when the linear motion mechanism 27 largely moves the lever side rod 19 forward or backward, the movement amount of the second transmission member 54 which rotates about the support portion 55 via the transmission rod 53 decreases. As a result, the movement amount of the arm member 131 decreases, and thus, the movement amount of the seal member 132 with respect to the throttle hole 123 decreases. Accordingly, it is possible to move the seal member 132 by a small amount with respect to the throttle hole 123 while moving the lever side rod 19 by a large amount. That is, it is possible to increase an operation stroke sensitivity of the linear motion mechanism 27 with respect to the opening degree of the adjustment valve 13.

At the time of a normal operation of the steam turbine 10, the operation is performed in a state where the adjustment amount of the opening degree of the adjustment valve 13 is small. Accordingly, the movement of the seal member 132 with respect to the throttle hole 123 is repeated within a slight range. The transmission portion 50 decreases the movement amount of the linear motion mechanism 27 transmitted via the lever side rod 19 and transmits the decreased movement amount to the seal member 132 via the arm member 131. Therefore, it is possible to move the seal member 132 small in a state where the movement amount of the lever side rod 19 is large. Accordingly, even in a state where the opening degree of the adjustment valve 13 is constant, the adjustment valve drive device 15 can increase the stroke of the linear motion mechanism 27 to prevent the linear motion mechanism 27 from being continuously oscillated slightly. As a result, it is possible to prevent the load ball 316 from coming into continuous contact with the transfer path M at a certain angle inside the linear motion mechanism 27, and it is possible to prevent a lubrication failure on the transfer path M.

Moreover, in one or more embodiments, the configuration in which the nut 311 moves forward to and backward from the screw shaft 30 is described. However, the present invention is not limited to this. For example, a drive type in which the screw shaft 30 moves forward to or backward from a fixed nut 311 may be adopted.

The linear motion mechanism 27 is not limited to the adjustment valve drive device 15 or the steam turbine 10 and may be applied to various uses.

INDUSTRIAL APPLICABILITY

According to the valve device, the lubricant with respect to the path surface of the transfer path is equalized by the lubricant contact portion so as to be evenly distributed, and thus, it is possible to prevent a lubrication failure.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10: steam turbine
11: turbine main body
111: casing
112: bearing
113: rotor
114: speed detection sensor
115: rotary shaft
116: blade
12: steam flow path
121: steam introduction port
122: steam supply port
123: throttle hole
13: adjustment valve
131: arm member
132: seal member
14: lever member
15: adjustment valve drive device
17: electronic governor
18: compressor
19: lever side rod
20: pulling spring
21: bracket
22: holding member
23: electric actuator
24: bearing cover
25: pedestal
26: electric motor
27: linear motion mechanism
O: axis
28: brake
29: motor accommodation portion
30: screw shaft
30m: first screw groove
31: piston unit
311: nut
311m: second screw groove
M: transfer path
317: circulation path
317a, 317b: both end portion
312: cylinder rod
313: rod end connector
314: actuator side rod
316: load ball
318: lubricant supply portion
318a: discharge port
G: lubricant
32, 42: retainer frame
321: retainer main body portion
321a: recessed surface
321b: through-hole
322, 422: lubricant contact portion
36: piston casing
37: piston cap
422a: first contact portion
422b: second contact portion

The invention claimed is:

1. A linear motion mechanism, comprising:
a drive portion;
a screw shaft which is rotationally driven about an axis by the drive portion and in which a first spiral screw groove is formed on an outer peripheral surface;
a nut in which a second spiral screw groove facing the first screw groove is formed on an inner peripheral surface, into which the screw shaft is inserted, and which moves forward or backward relative to the screw shaft in an axial direction, in which an axis of the screw shaft extends, according to a rotation of the screw shaft;
a plurality of load balls which are disposed in a transfer path formed by the first screw groove and the second screw groove and advance while rolling on the transfer path;
a plurality of retainer frames which are disposed between the plurality of load balls and advances on the transfer path along with the load balls; and a lubricant supply portion which supplies a lubricant to a path surface of the transfer path,
wherein the retainer frame includes
a retainer main body portion in which recessed surfaces, on which outer peripheral ends are in contact with the adjacent load balls, are formed on both sides in an advancement direction and which is formed to be smaller than the load ball when viewed in the advancement direction, and
a lubricant contact portion which protrudes from the outer peripheral end of the recessed surface of the retainer main body portion toward the path surface side of the transfer path and is formed to come into contact with the lubricant which is supplied to the path surface of the transfer path, and
wherein the lubricant contact portion is formed such that a cross-sectional shape orthogonal to the advancement direction partially protrudes toward the path surface of the transfer path more than the load ball.

2. The linear motion mechanism according to claim 1, wherein the lubricant contact portion is formed such that a length of a cross-sectional shape of the lubricant contact portion parallel in the advancement direction decreases toward an inside position interposed between the recessed surfaces from the outer peripheral ends of both recessed surfaces in the advancement direction toward the path surface side of the transfer path.

3. A valve device which opens and closes a flow path through which a working fluid flows by a valve body to adjust a flow rate of the working fluid, the valve device comprising:
the valve body; and
the linear motion mechanism according to claim 1 which moves the valve body forward or backward to open and close the flow path by the valve body.

4. The valve device according to claim 3, further comprising:
a linear motion member which moves in forward and backward directions along with the nut; and
a transmission portion which moves the valve body in a close direction which brings the flow path into a closed state where the working fluid cannot flow when the linear motion member moves forward, and moves the valve body in an open direction which brings the flow path into an open state where the working fluid can flow when the linear motion member moves backward,
wherein the transmission portion decreases a movement amount of the linear motion member and transmits the decreased movement amount to the valve body.

5. A steam turbine comprising:
a turbine main body which includes a blade which is rotated by the working fluid; and
the valve device according to claim 3.

* * * * *